Dec. 5, 1939. A. MATTSON 2,182,299

TAP LOCK EXPANSION OR COTTER PIN

Filed April 12, 1938

Arnold Mattson
INVENTOR.

BY *Knowles*
ATTORNEYS.

Patented Dec. 5, 1939

2,182,299

UNITED STATES PATENT OFFICE 2,182,299

TAP LOCK EXPANSION OR COTTER PIN

Arnold Mattson, Greeley, Colo.

Application April 12, 1938, Serial No. 201,596

1 Claim. (Cl. 85—8.5)

This invention relates to improvements in tap lock expansion and cotter pin, and more particularly to a cotter pin of the self locking type.

An object of the invention is to provide an improved self locking cotter pin, which may readily be manufactured by automatic machinery from half round or other suitable form of wire and which is constructed as to insure it being easily driven into a hole to lock the parts in position, the operation of the driving also causing the self locking of the pin within the cooperating parts.

Another object of the invention is to provide an improved self locking cotter pin, which will be formed from half round or other suitable wire, the pin being bent upon itself, formed with a weakened notch adjacent the closed end of the pin, and with uneven ends being bent over to provide locking and driving heads.

A still further object of my invention is to provide an improved self locking cotter pin, which will be formed from half round or other shaped wire, and further provided with a notched out portion of the inner side of one of the legs of the cotter pin adjacent the closed end thereof, and with uneven legs provided at their outer ends with bent over portions forming heads, which may be used for driving the cotter pin in position of use, and when the pin is expanded, the head on the longer leg will engage the head on the shorter leg to further lock the pin in locking position.

A still further object of the invention is to provide an improved self locking cotter pin, which will be formed from a section or piece of wire folded upon itself with uneven length legs, and one of said legs being formed with a notch adjacent the closed end of the pin, and the ends of the pin being bent over to form heads, whereby when the pin is positioned in place and the longer of the legs is driven in, the closed end of the pin will be caused to expand due to the notch formed in the leg to prevent movement of the pin in a withdrawing direction, and the head on the longer leg will engage the head on the shorter arm to force the two apart to lock the pin from entering any further into the cooperating locked parts.

Another object of my invention is to provide an improved form of self locking cotter pin which will be highly efficient in use, and quite inexpensive to manufacture.

Other objects will appear as the description proceeds.

In the accompanying drawing which forms a part of my application,

Like characters of reference are used throughout the following specification and the accompanying drawing to designate corresponding parts.

Figure 1:
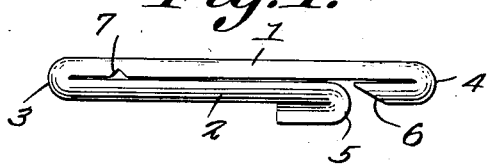
Figure 1 is a side elevation of my improved form of self locking cotter pin.

In the embodiment illustrated the cotter pins as a whole are formed of half round heavy wire and are made on a suitable automatic wire forming machine of lengths cut from a coil of any desired diameter and of any required length.

As will be seen, the cotter pin is formed of a single piece of wire forming a body portion with parallel legs 1 and 2, the bend at the head end of the cotter pin being illustrated by the reference numeral 3. The legs of the cotter pin are of uneven lengths, and are formed with bent over ends forming the heads 4 and 5 respectively. As will be seen, the bent over head 4 is formed with a rounded cam surface 6, for purposes hereinafter described.

Figure 3:
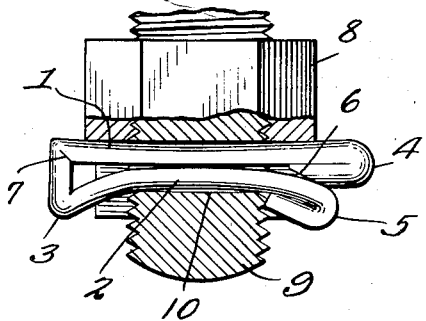
Figure 3 is a transverse sectional view through a portion of a bolt and castellated nut showing my improved self locking cotter pin in their position, the same having been locked within the said bolt and nut.
Figure 4:
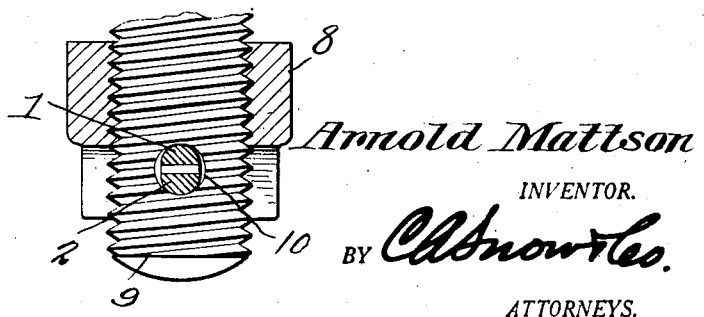
Figure 4 is a sectional view through a portion of a bolt showing the cross sectional shape of the cotter pin inserted therethrough.

On the inner wall of the leg 1 of the cotter pin, adjacent the forward end or edge 3, I have provided a notch 7, which will cause the head end 3 of the pin when inserted in position to lock two parts together, to grip, as illustrated in Figure 3 of the drawing.

Figure 2:
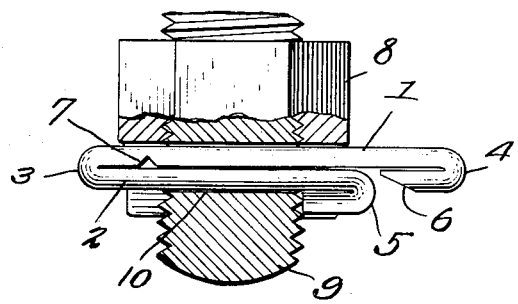
Figure 2 is a transverse sectional view through a portion of a bolt and cooperating castellated nut, showing my improved pin in position, but prior to being locked.

The mode of operation of my improved self locking cotter pin will be as follows:

Assuming that it is desired to lock a castellated nut 8 upon a bolt 9 through which the hole 10 extends, the cotter pin will be inserted through the notch in the castellated nut 8 and through the opening 10 in the bolt and through the opposite side of the nut 8, until it is in the position illustrated in Figure 2 of the drawing. In this position, the head 4 of the cotter pin will be knocked inwardly forcing the leg 1 of the pin in a horizontal manner, which action causes the portion of the pin between the notch 7 and the head end 3 to open up, until it assumes the position shown in Figure 3. By the continuous driving in of the head 4, the cam surface 6 on the head will engage the adjacent portion or head 5 of the leg 2, and the two heads 4 and 5 will be separated so as to prevent movement of the pin any further in the direction in which it was being driven.

When it is desired to remove the cotter pin, it is only necessary to grasp the end 3 of the pin and with a twisting motion bend the adjacent portions back into their original shape as illustrated in Figure 1 of the drawing, at which time the pin may readily be withdrawn from the opening in the nut and bolt.

It is obvious that my improved self locking cotter pin may be employed in locking pieces of mechanism together wherein the holes extending through the said pieces of mechanism are considerably larger than the size of the cotter pins. This feature is made possible due to the fact that when the pin is set in position for locking, the leg 2 will be considerably bowed, thereby wedging the cotter pin in position within the opening through which it extends.

I do not wish to limit myself to the exact shape or size of the cotter pin, neither do I desire to limit myself to the cross sectional shape of the wire from which the pin is made, as it will be apparent that any suitable shape may be employed within the scope of the invention.

Many minor changes in detail of construction may be resorted to without departure from the spirit of the invention.

Having thus described my invention what I claim as new and desire to secure by Letters Patent of the United States is:

A cotter pin of the class described, comprising straight first and second arms, the second arm being shorter than the first arm, the inner edges of the arms being substantially in contact throughout the entire length of the second arm, the arms being connected at one extremity by a bend, the first arm being provided on its inner edge with a transverse notch located closely adjacent to the bend, the second arm being provided at its opposite extremity with an underlying finger joined to the second arm by a second bend affording a curved surface, the first arm having an underlying finger supplied with a surface disposed at an acute angle to the longitudinal axis of the first arm, and outwardly of the second bend, in close relation thereto, the last-specified surface forming a wedge guided between the arms by contact with the curved surface, the first arm being angularly foldable at the notch.

ARNOLD MATTSON.